United States Patent
Turner

(10) Patent No.: US 9,868,622 B1
(45) Date of Patent: Jan. 16, 2018

(54) TRAILER LEVELING DEVICE

(71) Applicant: Randy F. Turner, Weaverville, CA (US)

(72) Inventor: Randy F. Turner, Weaverville, CA (US)

( * ) Notice: Subject to any disclaimer, the term of this patent is extended or adjusted under 35 U.S.C. 154(b) by 0 days.

(21) Appl. No.: 15/383,611

(22) Filed: Dec. 19, 2016

(51) Int. Cl.
  *B66F 7/24* (2006.01)
  *B60T 3/00* (2006.01)
  *B60P 7/12* (2006.01)

(52) U.S. Cl.
  CPC ............ *B66F 7/243* (2013.01); *B60T 3/00* (2013.01); *B60P 7/12* (2013.01); *B66F 2700/09* (2013.01)

(58) Field of Classification Search
  CPC . B60T 3/00; B66F 3/005; B66F 7/243; B65G 15/04; B65G 15/06; B65G 15/08; B65G 15/42; B65G 15/52; B65G 17/064; B65G 17/14; B65G 17/16; B65G 17/26; B65G 17/34; B65G 17/42; B65G 17/44
  See application file for complete search history.

(56) References Cited

U.S. PATENT DOCUMENTS

| | | | | |
|---|---|---|---|---|
| 354,010 A | * | 12/1886 | Black | ............... B60T 3/00 12/1 M |
| 770,510 A | * | 9/1904 | Stullken | ............... B60T 3/00 188/32 |
| 1,947,346 A | | 2/1934 | Lintern | |
| 1,996,612 A | | 4/1935 | Cook | |
| 2,413,744 A | | 1/1947 | Carter | |
| 2,712,432 A | | 7/1955 | Thornton | |
| 2,822,063 A | * | 2/1958 | Hampton | ............... B60T 3/00 188/166 |
| 2,858,905 A | * | 11/1958 | Fahland | ............... B60T 3/00 410/30 |
| 2,954,101 A | | 9/1960 | Corson | |
| 3,065,680 A | | 11/1962 | Wiedman | |
| 3,091,348 A | * | 5/1963 | Neuhauser | ............ B65D 71/70 206/386 |
| 3,289,794 A | * | 12/1966 | Miles | ............... B60T 3/00 188/32 |
| 3,298,665 A | | 1/1967 | Sieloff | |
| 3,317,007 A | * | 5/1967 | Braun | ............... B60T 3/00 188/32 |
| 3,632,087 A | * | 1/1972 | Phillips | ............... B60P 3/36 254/88 |
| 3,661,229 A | | 5/1972 | Stonhaus | |
| 3,664,466 A | | 5/1972 | Rotheiser | |
| 3,684,233 A | | 8/1972 | Vukich | |
| 3,770,323 A | | 11/1973 | Isaacson | |
| 4,034,961 A | | 7/1977 | Breen | |
| 4,165,862 A | | 8/1979 | Bennett | |
| 4,399,893 A | * | 8/1983 | Switzer | ............... B60T 3/00 188/32 |

(Continued)

*Primary Examiner* — Christopher M Koehler
*Assistant Examiner* — Seahee Yoon
(74) *Attorney, Agent, or Firm* — Inventive Patent Law P.C.; Jim H. Salter

(57) ABSTRACT

The disclosed embodiments relate to a drive-on leveling device that is adapted for single and tandem axle recreational trailers. It is placed beneath the trailer wheel that supports the weight of the vehicle, on the side that has the lower elevation. The leveling device's two-block assembly creates a level plane that is stationary. The incline block and chock block are each designed with tines that allow insertion into one another for quick leveling and chocking.

7 Claims, 5 Drawing Sheets

(56) References Cited

U.S. PATENT DOCUMENTS

| | | | | |
|---|---|---|---|---|
| 4,615,416 | A * | 10/1986 | Wilson | B60T 3/00 188/32 |
| 4,804,070 | A * | 2/1989 | Bohler | B60R 25/09 188/32 |
| 5,465,814 | A * | 11/1995 | Ziaylek | B60T 3/00 188/32 |
| 5,515,977 | A * | 5/1996 | Lambert | B65D 19/44 206/395 |
| 6,260,666 | B1 * | 7/2001 | Freeman | B60T 3/00 188/2 R |
| RE37,575 | E * | 3/2002 | Lambert | B65D 19/44 206/395 |
| D652,952 | S | 1/2012 | Angel | |
| 8,491,238 | B2 * | 7/2013 | Winsor | B60T 3/00 410/19 |
| 9,139,123 | B2 | 9/2015 | Cepynsky | |
| 9,487,328 | B2 * | 11/2016 | Edwards | B65D 19/0095 |
| 2007/0050999 | A1 * | 3/2007 | Milner | B60R 25/09 33/286 |

* cited by examiner

US 9,868,622 B1

TRAILER LEVELING DEVICE

TECHNICAL FIELD

The disclosed embodiments relate to a drive-on leveling device that is adapted for single and tandem axle recreational trailers or vehicles.

BACKGROUND

Recreational trailers are frequently parked on sloping terrain comprised of dirt, gravel, sand or asphalt. Uneven ground results in one wheel of the trailer being lower than the opposite side. A level trailer is much more comfortable and usable with appliances, sink drains, tables, berthing, etc.

Today, as in the past, heavy and inconvenient hydraulic jacks are still used to level. Tall manual hydraulic bottle jacks are difficult to place under the trailer, and with unstable ground, tend to fall over. Even when the trailer is elevated with a jack, the wheels of the trailer need to be blocked with chocks to prevent movement. Because of constant movement of people within the trailer, there is also a tendency to cause jacks to fall.

SUMMARY

The purpose of the example embodiments is to provide an easier-to-use trailer leveling device made with blocks with opposing tines which create level height when placed together. The leveling device comes into use so as to create a flat level plane.

Another purpose of the device is to provide leveling at the same time as chocking of the wheel to prevent movement of the trailer.

Another purpose of the device is to simplify the leveling process with fewer steps of operation.

Another purpose of the device is to have a strong, lightweight, durable assembly block that can easily be transported.

Another purpose of the example embodiments is to use the incline block portion of the device to elevate the trailer tire while the tow vehicle is hitched to the trailer. Next, inserting the chock block behind the wheel on the ground completes the leveling process.

Another purpose of the device is to create a leveling block that requires no tools to operate.

Another purpose of the example embodiments is to prevent further movement of the trailer by creating a greater surface area on the bottom of the device.

Another purpose of the example embodiments is to provide a locking effect. Both blocks of the assembly use vertical tines and channels. When blocks are placed opposite each other and inserted together, they form a locking effect. The surfaces of the tines when exposed to the trailer weight create even pressure that is distributed over the ground, even if the ground surface is uneven.

Another purpose of the example embodiments is to allow slight movement in the tine assembly to create movement that conforms to subtle changes in ground surface irregularities.

BRIEF DESCRIPTION OF THE DRAWINGS

Embodiments illustrated by way of example and not limitation in the figures of the accompanying drawings, in which.

DETAILED DESCRIPTION

The disclosed embodiments relate to a drive-on leveling device that is adapted for single and tandem axle recreational trailers. However, it is understood that embodiments may be practiced without the specific details disclosed herein. In other instances, well-known processes, structures and techniques have not been shown in detail in order not to obscure the clarity of this description. Various embodiments are described below in connection with the figures provided herein.

Referring now to FIGS. 1 through 9, a leveling block assembly 8 uses a new concept which is different from prior leveling blocks for trailers. A combination of tines 24 with channels 26 between them are inserted, one into the other, of the opposing block.

Figure 1:
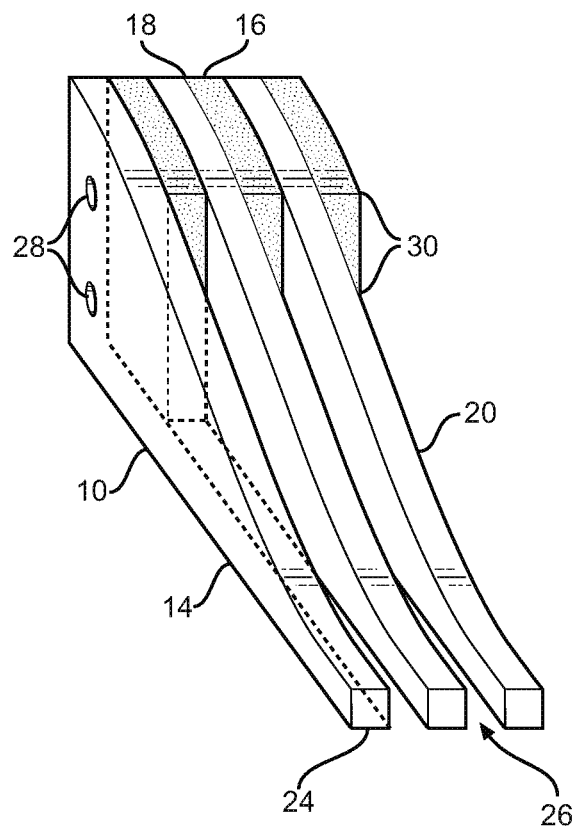
FIG. 1 illustrates an angle view of the incline block.
Figure 2:
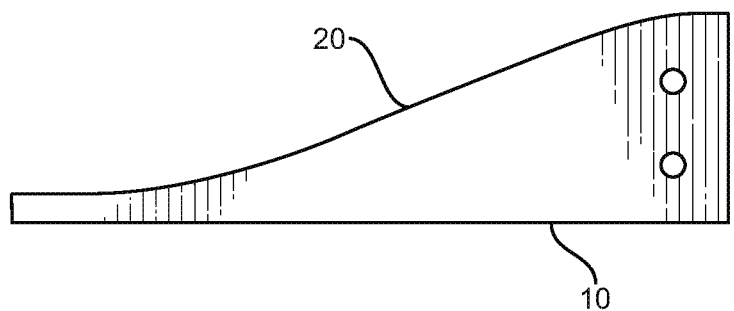
FIG. 2 illustrates a side view of the incline block.
Figure 3:
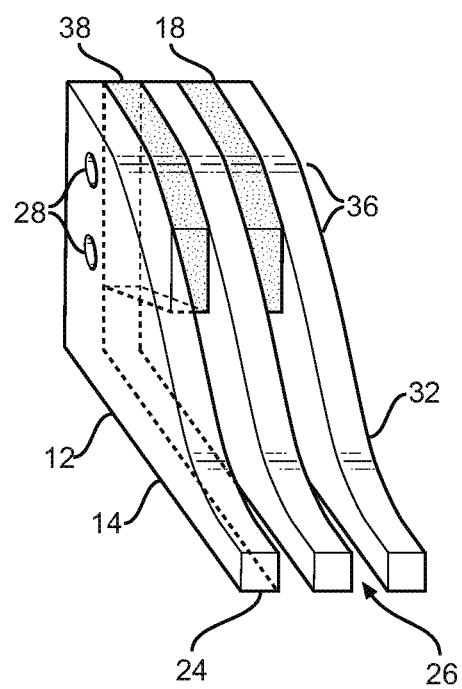
FIG. 3 illustrates an angle view of the chock block.
Figure 4:
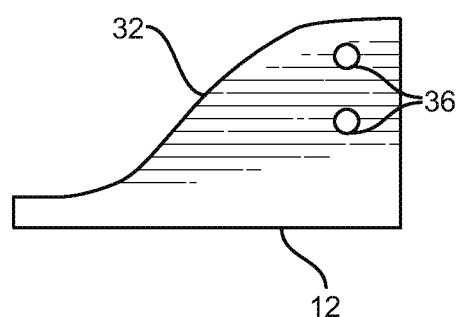
FIG. 4 illustrates a side view of the chock block.
Figure 5:
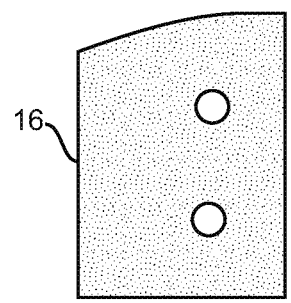
FIG. 5 illustrates the side view of the spacer block used with incline block.
Figure 6:
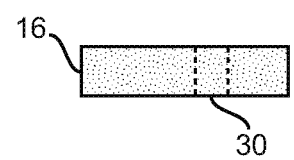
FIG. 6 illustrates the top view of the spacer block used with the incline block.
Figure 7:
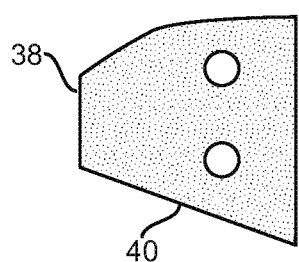
FIG. 7 illustrates the side view of the spacer block used with the chock block.
Figure 8:
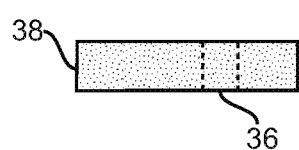
FIG. 8 illustrates top view of the spacer block used with chock block.

Referring to FIGS. 1 and 3, the two-part leveling block assembly 8 consists of the tine incline block 10 and the tine chock block 12. The tine incline block 10 and the tine chock block 12 are each comprised of a plurality of vertical blocks 14. The vertical blocks 14 in the leveling device support the trailer weight much like a cattle guard or grate.

Referring again to FIG. 1, the incline block 10 is comprised of a plurality (e.g., three) of tine blocks 24 and a plurality (e.g., two) of spacer blocks 16 with a plurality (e.g., two) of one-centimeter (or other dimension) thick shims 18 positioned between the tine blocks 24 and the spacer blocks 16. The shims 18 mirror the dimensions of the incline spacer blocks 16 and make entering of the tines 24 of the channels 26 of the opposing block easier. The incline block 10 has roughly a 15 degree incline 20 for the trailer wheel 22 to climb. It will be apparent to those of ordinary skill in the art that the incline angle of the incline block 10 can be a different angle and still be within the scope of the present disclosure.

In normal use, the incline block 10 can be positioned on the ground at a location where the user desires to lift or level a trailer or other wheeled apparatus. The user can drive or tow the trailer or other wheeled apparatus so that the wheels 22 of the trailer or other wheeled apparatus roll up the incline 20 of the incline block 10 to a desired height. When the wheel 22 is at the proper leveling height, the chock block 12 is inserted into the incline block 10, interleaving the tines 24 and spaces 26 of the incline block 10 with the tines 24 and spaces 26 of the chock block 12 to lock and maintain the desired height of the wheel 22.

Referring again to FIG. 3, the chock block 12 has a plurality (e.g., three) of tine blocks 24 and a plurality (e.g., two) spacer blocks 38. A plurality (e.g., two) of shims 18 that mirror the dimensions of the spacer blocks 38 are placed into the chock block 12 assembly, positioned between the tine blocks 24 and the spacer blocks 16. The spacer blocks 38 have a 15 degree down angle 40 (see FIG. 7) to allow opposing tines 24 from the incline block 10 to insert completely into the spaces 26 of the chock block 12. It will be apparent to those of ordinary skill in the art that the down angle 40 of the spacer blocks 38 can be a different angle and still be within the scope of the present disclosure.

Figure 9:
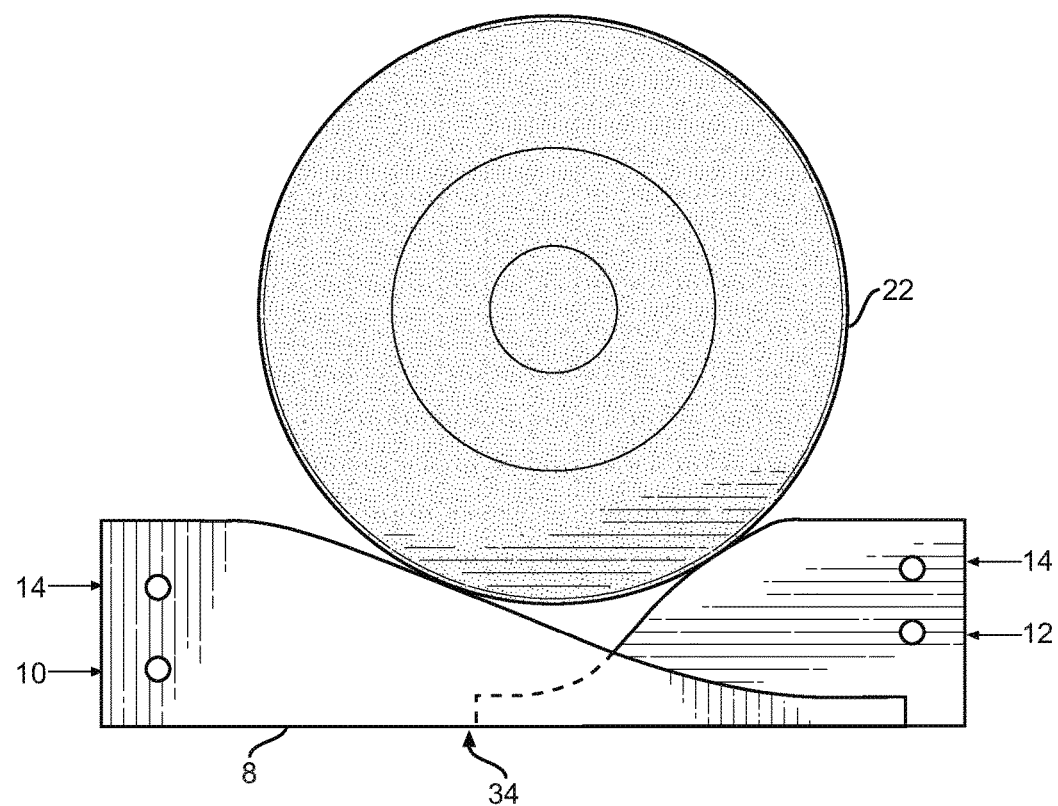
FIG. 9 illustrates the side view of a wheel in the cradle of the trailer leveling device.

The combination of the vertical blocks 14, the spacer blocks 16/38, and the shims 18 of the incline block 10 and the chock block 12 can be held together by at least one (e.g., two) lateral bolt, washers, and nuts 28. In an example embodiment, the incline block 10 uses two ⅜" bolts 30, which are 6½" in length. In an example embodiment, the chock block 12 uses two ⅜" bolts 36, which are 5½" in length. In the example embodiment, all vertical blocks 14, the spacer blocks 16, and the shims 18 are drilled for assembly with ½" holes. When the incline block 10 and the chock block 12 are assembled, they have enough clearance in the holes to allow slight movement of the tines 24. This movement between the tines 24 allows slight adjustment of the incline block 10 and the chock block 12 to the irregular surface of the ground. Subtle movement between the incline block 10 and the chock block 12, as assembled, creates a locking effect. This action helps cradle the trailer wheel 22 as shown in FIG. 9, thus preventing either loss of the level or movement of the wheel 22. The leveling block assembly 8 works on asphalt, dirt, gravel, sandy ground, or any other type of even or uneven surface. The leveling block assembly 8 has a large surface area 34, and a width at least as large as the width of wheel 22, to transfer trailer weight to the ground.

In an example embodiment, the chock block 12 has an incline slope 32 of approximately 30 degrees, which keeps the wheel 22 from moving. In an example embodiment, the chock block 12 is about half the length of the incline block 10.

In an example embodiment, the incline block 10 and the chock block 12 are fabricated from high density polyethylene plastic material (HDPE). The advantages of using this type of material are surprising strength, durability, and light weight construction. HDPE material is impervious to rain or pH of the soil conditions. In an example embodiment, the incline block 10 and the chock block 12 are fabricated from a material (e.g., an HDPE board) that is 1" thick and 5½" wide. In an example embodiment, the incline block 10 is 20" in length, and the chock block 12 is 10" in length. All hardware is steel, used in conjunction with washers and nylon insert nuts 28.

The entire leveling block assembly 8 can be joined together with the lateral hardware bolts 30 and 36 and washers and nuts 28. When tightening together each of the incline block 10 and the chock block 12 of the assembly 8, the assembly should not be overly tightened. This slight slack allows both the vertical and horizontal movement of the tines 24, which is beneficial for the leveling block assembly 8 so that the leveling block assembly 8 conforms to an uneven ground surface when the weight of the trailer wheel 22 is applied. When the vertical blocks 14 are placed together, their movement serves even more to lock the component parts of the leveling assembly block 8.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of ordinary skill in the art upon reviewing the above description. Other embodiments may be utilized and derived therefrom, such that structural and logical substitutions and changes may be made without departing from the scope of this disclosure. The figures provided herein are merely representational and may not be drawn to scale. Certain proportions thereof may be exaggerated, while others may be minimized. Accordingly, the specification and drawings are to be regarded in an illustrative rather than a restrictive sense.

The description herein may include terms, such as "up", "down", "upper", "lower", "first", "second", "front", "rear", "top", "bottom", etc. that are used for descriptive purposes only and are not to be construed as limiting. The elements, materials, geometries, dimensions, and sequence of operations may all be varied to suit particular applications. Parts of some embodiments may be included in, or substituted for, those of other embodiments. While the foregoing examples of dimensions and ranges are considered typical, the various embodiments are not limited to such dimensions or ranges.

The Abstract is provided to comply with 37 C.F.R. §1.74(b) to allow the reader to quickly ascertain the nature and gist of the technical disclosure. The Abstract is submitted with the understanding that it will not be used to interpret or limit the scope or meaning of the claims.

In the foregoing Detailed Description, various features are grouped together in a single embodiment for the purpose of streamlining the disclosure. This method of disclosure is not to be interpreted as reflecting an intention that the claimed embodiments have more features than are expressly recited in each claim. Thus, the following claims are hereby incorporated into the Detailed Description, with each claim standing on its own as a separate embodiment.

Thus, a drive-on leveling device that is adapted for single and tandem axle recreational trailers is disclosed. While the present invention has been described in terms of several example embodiments, those of ordinary skill in the art can recognize that the present invention is not limited to the embodiments described, but can be practiced with modification and alteration within the spirit and scope of the appended claims. The description herein is thus to be regarded as illustrative instead of limiting.

What is claimed is:

1. A trailer leveling device comprising:
   an incline block having multiple tines and spaces between the tines of the incline block, coupled together with a first lateral bolt, the multiple tines of the incline block being configured to enable vertical, horizontal, and pivotal movement of the incline block tines relative to each other, the first lateral bolt not being overly tightened to provide slack enabling the vertical, horizontal, and pivotal movement of the incline block tines relative to each other; and
   a chock block having multiple tines and spaces between the tines of the chock block, coupled together with a second lateral bolt, the multiple tines of the chock block being configured to enable vertical, horizontal, and pivotal movement of the chock block tines relative to each other, the second lateral bolt not being overly tightened to provide slack enabling the vertical, horizontal, and pivotal movement of the chock block tines relative to each other, the multiple tines of the chock block being inserted into the spaces between the tines of the incline block interleaving the tines and spaces of the incline block with the tines and spaces of the chock block.

2. The trailer leveling device of claim 1, wherein the incline block has a width at least as large as the width of the trailer wheel for better lateral stability of the incline block and greater transfer of weight over a large surface area.

3. The trailer leveling device of claim 1 wherein the multiple tines of the incline block are loosely coupled with the first lateral bolt to allow movement between the tines and spaces of the incline block to transfer weight and to respond to subtle changes in the ground's surface, the movement between the tines and spaces of the incline block causing a lateral pressure creating a locking effect.

4. The trailer leveling device of claim 1 wherein the multiple tines of the chock block are loosely coupled with the second lateral bolt to allow movement between the tines and spaces of the chock block creating a better chock block effect when the trailer wheel is at a higher elevated level.

5. A drive-on leveling device for elevating a trailer wheel and maintaining the wheel in an elevated position, the drive-on leveling device comprising:
  an incline ramp having multiple tines and spaces between the tines of the incline ramp, coupled together with a first lateral bolt, to support the trailer wheel, the incline ramp having sufficient surface area for wheel contact and ground surface area contact, the incline ramp having a gradual degree of height over its length to allow easy trailer tire mounting, the multiple tines of the incline ramp being configured to enable vertical, horizontal, and pivotal movement of the incline ramp tines relative to each other, the first lateral bolt not being overly tightened to provide slack enabling the vertical, horizontal, and pivotal movement of the incline ramp tines relative to each other; and
  a chock block having multiple tines and spaces between the tines of the chock block, coupled together with a second lateral bolt, for placement behind the trailer wheel when proper height is reached upon mounting the trailer wheel on the incline ramp; the chock block having a sufficient angle to prevent movement of the trailer wheel in reverse, the chock block having sufficient surface area to support the trailer wheel in order to transfer trailer weight to the ground, the multiple tines of the chock block being configured to enable vertical, horizontal, and pivotal movement of the chock block tines relative to each other, the second lateral bolt not being overly tightened to provide slack enabling the vertical, horizontal, and pivotal movement of the chock block tines relative to each other, the multiple tines of the chock block being inserted into the spaces between the tines of the incline ramp interleaving the tines and spaces of the incline ramp with the tines and spaces of the chock block.

6. The drive-on leveling device of claim 5 wherein the multiple tines of the incline ramp are loosely coupled with the first lateral bolt to allow movement between the tines and spaces of the incline ramp causing a lateral pressure creating a locking effect.

7. The drive-on leveling device of claim 5 wherein the multiple tines of the chock block are loosely coupled with the second lateral bolt to allow movement between the tines and spaces of the chock block causing a lateral pressure creating a locking effect.

\* \* \* \* \*